US012606297B2

(12) United States Patent
Spicer

(10) Patent No.: US 12,606,297 B2
(45) Date of Patent: Apr. 21, 2026

(54) CAVITY ACOUSTIC TONES SUPPRESSION

(71) Applicant: BAE SYSTEMS plc, London (GB)

(72) Inventor: Stephen John Spicer, Brough Yorkshire (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/693,076

(22) PCT Filed: Aug. 19, 2022

(86) PCT No.: PCT/GB2022/052156
§ 371 (c)(1),
(2) Date: Mar. 18, 2024

(87) PCT Pub. No.: WO2023/041893
PCT Pub. Date: Mar. 23, 2023

(65) Prior Publication Data

US 2025/0145278 A1 May 8, 2025

(30) Foreign Application Priority Data

Sep. 17, 2021 (GB) ..................................... 2113376

(51) Int. Cl.
*B64C 23/06* (2006.01)
*B64D 1/06* (2006.01)
*B64C 25/00* (2006.01)

(52) U.S. Cl.
CPC ................ *B64C 23/06* (2013.01); *B64D 1/06* (2013.01); *B64C 25/001* (2013.01); *B64C 2025/003* (2013.01); *B64C 2230/14* (2013.01)

(58) Field of Classification Search
CPC ............ B64C 2230/14; B64C 2230/00; B64C 2230/24; B64C 2025/003; B64C 23/00
See application file for complete search history.

(56) References Cited

U.S. PATENT DOCUMENTS 6,296,202 B1 10/2001 Stanek
6,446,904 B1 * 9/2002 Stanek .................... B64D 7/00 244/1 N (Continued)

FOREIGN PATENT DOCUMENTS

CN 102514635 A 6/2012
CN 102862676 B 10/2014

(Continued)

OTHER PUBLICATIONS

International Search Report dated Nov. 17, 2022 issued in PCT/GB2022/052156.
GB Search Report dated Mar. 24, 2022 issued in GB 2113376.4.

*Primary Examiner* — Magdalena Topolski
*Assistant Examiner* — Shanna Danielle Glover
(74) *Attorney, Agent, or Firm* — Scully, Scott, Murphy & Presser, P.C.

(57) ABSTRACT

A cavity system (300-600) is provided. The cavity system comprises a cavity (2) and a spoiler (304-604). The spoiler (304-604) comprises at least one plate (4) having a front surface and a rear surface, and an undulating edge. The spoiler (304-604) is positioned in the proximity of a leading edge (14) of the cavity (2), the leading edge (14) being relative to an actual or intended flow direction (3) of a fluid over the cavity (2), and the spoiler (304-604) is arranged with its longitudinal axis (1) perpendicular to or at an oblique angle to the actual or intended flow direction (3) such that the front surface faces towards the flow direction (3).

13 Claims, 5 Drawing Sheets

(56) References Cited

U.S. PATENT DOCUMENTS

| | | | |
|---|---|---|---|
| 10,487,744 B2 * | 11/2019 | Post | F02C 3/04 |
| 2006/0075694 A1 | 4/2006 | Lin | |
| 2011/0223022 A1 | 9/2011 | Wang et al. | |
| 2016/0031290 A1 * | 2/2016 | Molin | B60H 1/00564<br>165/44 |
| 2016/0031549 A1 | 2/2016 | Patience | |
| 2016/0121996 A1 | 5/2016 | Eveker et al. | |
| 2016/0288632 A1 | 10/2016 | Sinha et al. | |
| 2018/0155013 A1 | 6/2018 | Elbracht et al. | |

FOREIGN PATENT DOCUMENTS

| | | | | |
|---|---|---|---|---|
| CN | 108706092 A | * 10/2018 | B64C 23/00 |
| CN | 108706092 B | 6/2020 | |
| CN | 111976442 A | 11/2020 | |
| DE | 102004048532 A1 | 4/2006 | |
| FR | 2956646 A1 | * 8/2011 | B64C 25/16 |

* cited by examiner

CAVITY ACOUSTIC TONES SUPPRESSION

FIELD OF THE INVENTION

The present invention relates to methods and systems for suppression of acoustic tones and/or resonance and/or noise and/or other acoustic tone effects in cavities for when they are moving relative to an ambient fluid such as air. The present invention relates in particular to, but is not limited to, such methods and systems for vehicle cavities. Example vehicles include aircraft, and therefore example cavities include bays such as weapons bays and landing gear bays.

BACKGROUND

When a cavity is moving in ambient fluid, for example when an aircraft bay is moving in air, a shear layer is formed between the moving ambient air and the static air in the cavity (from the reference point of the aircraft). A vortex is shed from the cavity leading edge and grows as it travels down the shear layer and impacts on the aft (trailing) wall of the bay resulting in the emission of noise. Also, the acoustic wave travels back upstream inside the bay. The fluctuating pressure of the acoustic wave may either result in vortices being shed from the leading edge cavity lip or an increase in the growth rate of the vortices such that a series of vortices is formed down the shear layer at a preferential rate which is related to the frequency of the upstream acoustic wave. The vortices grow into large-scale structures as they propagate downstream in the shear layer and then impact the aft (trailing) wall of the bay at a characteristic rate. This results in acoustic noise being generated at a characteristic rate that may be described as acoustic tones of a characteristic frequency.

The frequency of the tones may be formulated using Rossiter's equation. It can be seen that there is a feedback loop formed by the passage of the vortices and the upstream propagating acoustic wave.

Similar problems are found in other types of vehicles, such as high performance cars having open roofs or windows, or ships at sea with open hatches where the impinging wind speed is high.

Therefore, there is a need for a lightweight palliative mechanism for reducing acoustic noise in cavities moving through fluid.

It is known in aircraft to employ spoiler arrangements to divert the airflow over and beyond the cavity, i.e. over and beyond any boundary layer or prospective shear layer so that the above-described effects do not take place. In other words, existing standard palliatives aim to provide a form of noise suppression by diverting the shear layer away from the cavity, thickening (diverging) the shear layer, or by generating multiple small scale turbulence resulting in multiple small vortices within the shear layer. In this way, the formation of large-scale vortices in the shear layer, which are part of the tone generation procedure, is disrupted. A method to stop small scale vortices forming into larger vortices is to increase the thickness of the shear layer, as the small vortices move at different speeds which in turn reduces temporal coherence, disrupting larger vortices from forming. Various palliative/spoiler options have different mechanisms that help to reduce noise and tonal resonance.

The present inventor has realised how to improve on such spoilers to further reduce acoustic noise in a cavity.

SUMMARY OF THE INVENTION

According to a first aspect of the present invention, there is provided a cavity system, comprising: a cavity and a spoiler; and the spoiler comprising at least one plate having a front surface and a rear surface, and an undulating edge in longitudinal cross-section; wherein the spoiler is positioned in proximity to a leading edge of the cavity, the leading edge being relative to an actual or intended flow direction of a fluid over the cavity, and wherein the spoiler is arranged with its longitudinal axis to perpendicular or at an oblique angle to the actual or intended flow direction such that the front surface faces towards the flow direction.

Advantageously, by the spoiler having an undulating surface opposite the cavity, the possibility of increased numbers or variations of sources of fine scale turbulence, with corresponding increased numbers of small vortices and/or thicker shear layer and/or increased disruption of the temporal coherence of the small vortices tends to be increased. Any such effects may further improve the suppression performance of the suppression system.

The spoiler may be arranged to rotate or slide relative to the leading edge.

The undulating edge may be integrally formed in an edge of the or each plate opposite the edge of the or each plate proximate to the cavity. Alternatively, the undulating edge may be attached to an edge of the or each plate. The undulating edge may be offset from an edge of the or each plate opposite the edge of the or each plate proximate to the cavity. The undulating edge may protrude from a surface of the or each plate.

The cavity system may comprise a connecting structure for coupling the undulating edge to the or each plate, the connecting structure having a first end attached to the front surface of the or each plate or the rear surface of the or each plate, and a second end comprising the undulating edge.

The connecting structure may comprise a horizontal member, having the first end, extending substantially horizontally from the front or rear surface of the or each plate, and a vertical member coupled substantially orthogonally to the horizontal member and having the second end.

The cavity system may comprise first and second connecting structures for coupling a first and second undulating edge to the or each plate, the first connecting structure having a first end attached to the front surface of the or each plate and a second end comprising the first undulating edge, and the second connecting structure having a first end attached to the rear surface of the or each plate and a second end comprising the second undulating edge.

The first undulating edge may comprise a first set of teeth and the second undulating edge comprises a second set of teeth, wherein the first set of teeth is offset from the second set of teeth along the longitudinal axis of the spoiler.

The undulating edge may comprise a plurality of teeth. A first tooth in the plurality of teeth may be arranged closer to the leading edge than a second tooth in the plurality of teeth. At least one of the teeth may be orientated such that the plane of its front surface is twisted relative to the adjacent front surface of the plate. A first tooth in the plurality of teeth may be taller than a second tooth in the plurality of teeth. Alternatively, the teeth may all be of uniform height. The teeth may be generally triangular in longitudinal cross-section. Alternatively, the teeth may comprise a generally square, rectangular or curved shape in longitudinal cross-section.

The proportion of the area of the spoiler taken up by the teeth may be ≤75%.

The spoiler may comprise a plurality of plates, wherein a free edge of each plate in the plurality of plates is coupled to a free edge of an adjacent plate, with an angle between 10 degrees and 170 degrees being formed between two adjacent plates such that the plurality of plates form a zigzag in transverse cross-section. In other words, in transverse cross-section, the spoiler has a zigzag form. Preferably, an angle between 70 degrees and 110 degrees is formed between the two adjoining plates.

A first plate may comprise a first part of one of the teeth, and a second plate comprises a second part of the one of the teeth.

The front and/or rear surface of the or each plate may be non-planar in transverse cross-section. In transverse cross-section, the front surface of the spoiler may comprise a plurality of peaks and troughs. The front and/or rear surface of the or each plate may be sinusoidal in transverse cross-section.

The rear surface of spoiler may match the contour of the front surface of the spoiler. Alternatively, the rear surface of the spoiler may be planar.

According to a second aspect of the present invention, there is provided an aircraft comprising the cavity system according to the first aspect, wherein the cavity is a weapons bay.

DETAILED DESCRIPTION

It will be appreciated that relative terms such as horizontal and vertical, top and bottom, above and below, front and back, and so on, are used above merely for ease of reference to the Figures, and these terms are not limiting as such, and any two differing directions or positions and so on may be implemented rather than truly horizontal and vertical, top and bottom, and so on. In particular, for convenience, in the Figures a cavity is shown with it opening at the top of the page, and so for convenience the word "top" is used to mean the opening of the cavity, and the word "above" means further away from the cavity. However, it will be appreciated that the present disclosure refers also to cavities positioned for example underneath the wing or fuselage of e.g. an aircraft, i.e. upside down to that shown in the Figures, but the description use of the word "top" will still refer to the opening part of the cavity and that of the word "above" will still refer to being away from the cavity.

The concepts that follow are modifications of existing palliatives. The described shapes tend to reduce adverse acoustic effects. By varying the geometry of the palliatives (namely, spoilers) to include a lateral component, it is possible to add a lateral component to the airflow over them, which reduces energy of the airflow within the cavity to some extent. By adding additional sharp edges to the top of the palliatives, the amount of vortex shedding increases as well as the compactness of the shear layer being reduced, both of which should reduce disadvantageous acoustic properties and noise. Thus, the alterations to existing spoilers described below will improve their palliative effect within cavities.

Figure 1:
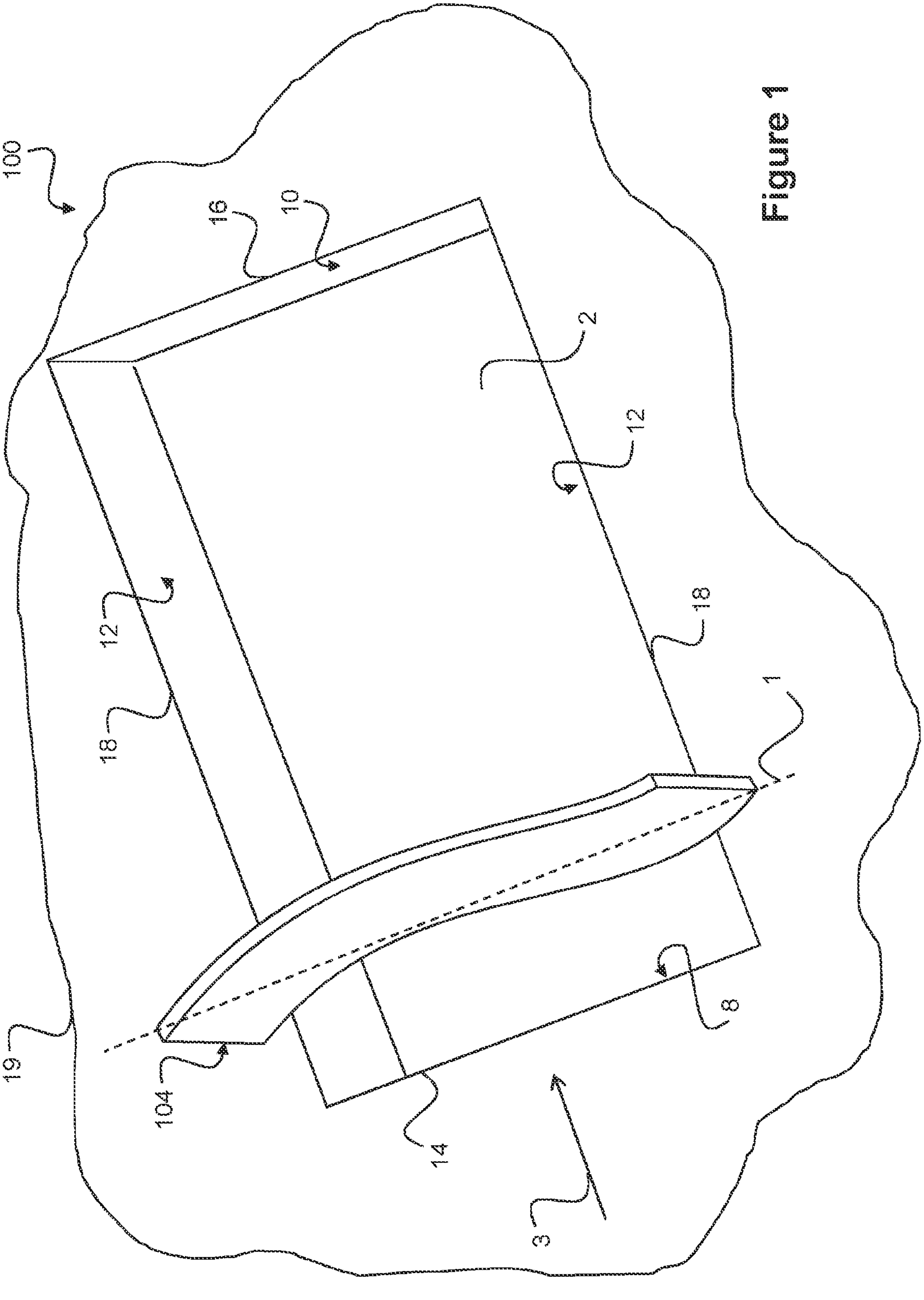
FIG. 1 is a schematic illustration (not to scale) of a perspective view of a cavity acoustic tones suppression system.

FIG. 1 is a schematic illustration (not to scale) of a perspective view of a first embodiment of a cavity acoustic tones suppression system 100 (hereinafter referred to as the suppression system 100). The suppression system 100 comprises a cavity 2, and a member having a substantially plate form (hereinafter referred to as a spoiler) 104 extending in use out of the cavity 2 into the ambient airflow.

In this embodiment, the spoiler 104 has curved (i.e. non-planar, undulating) front and rear surfaces. The front surface of the spoiler 104 is that facing the incident flow 3.

In the illustrated embodiment, the spoiler 104 is sinusoidal, or wavy, in transverse cross-section i.e. when looking through the spoiler 104 from above (i.e. in plan view). In other words, the spoiler 104, or at least a front surface thereof, comprises an arrangement of adjacent convex and concave regions surfaces. By the spoiler 104 being sinusoidal, at least across its front surface, i.e. having a lateral component, energy is removed from the incident flow 3. Here, sinusoidal means the front surface of the spoiler 104 has peaks and troughs, where the peaks are closer to the front (leading wall 8) of the cavity 2 than the troughs. In the illustrated embodiment, the rear surface of the spoiler 104 matches the contour of the front surface.

Instead of the spoiler 104 being sinusoidal (i.e. having a plurality of adjoined convex and concave regions), the spoiler 104 may be entirely convex or entirely concave along its length.

The spoiler 104 could be made from any material strong enough to withstand high velocity freestream flow and high noise. For example, the spoiler 104 may be made of titanium or a composite such carbon fibre. Alternatively, the spoiler 104 may be formed of a plastic or aluminium. The spoiler 104 may be made of the same material as the skin of the vehicle to which it is attached. The spoiler 104 may be formed of gauze or mesh.

In this embodiment, the cavity 2 is rectangular and comprises a planar base. The cavity 2 further comprises, defined relative to an actual or intended flow direction 3, a leading wall 8, an aft (trailing) wall 10, and two side walls 12. In this embodiment, these walls are all perpendicular to the planar base. At the top of the cavity 2, the cavity 2 comprises, for each of these walls respectively, a leading edge 14, an aft (trailing) edge 16, and two side edges 18.

Also shown in FIG. 1 is the plane of a surface 19, e.g. a skin of a vehicle such as an aircraft that surrounds the cavity 2 (i.e. the surface 19 for which a gap or major change in orientations in that surface 19 creates the opening of the cavity 2).

The spoiler 104 may be rotatably attached to the side walls 12, leading wall 8 or aft wall 12 of the cavity 2 or otherwise rotatably attached to a surface 19 surrounding the outside of the cavity. In other words, the suppression system 100 may comprise a hinge coupled to the spoiler 104 for allowing the spoiler 104 to rotate relative to the cavity 2. Such hinges include examples such as an offset hinge or leaf hinge. Thereby, in use, the spoiler 104 is arranged to rotate up into the airflow away from the body of the vehicle. For example, the cavity 2 may be a weapons bay on an aircraft, and the spoiler 104 may translate from a first, stored, position with its front surface parallel with the base of the cavity 2 to a second, deployed, position, with its front surface orthogonal to the flow direction 3 when the weapons bay are doors open.

Alternatively, the spoiler 104 may be slideably attached to the leading wall 8, aft wall 10, or side walls 12, such that in use it can be slid without rotation from a stored position into the airflow in a deployed position. In further embodiments still, the spoiler 104 may be arranged to both slide and rotate in order to be moved into position in the airflow when the cavity 2 is open (i.e., in use).

The hinge or sliding mechanism may be motorised, mechanically actuated by movement of a door covering the cavity 2, or spring loaded.

In the illustrated embodiment, the spoiler 104 is arranged with its surface extending, albeit in a complex path, across the width of the cavity 2 i.e. in a transverse direction to the flow direction 3, i.e. in this embodiment the longitudinal axis 1 of the spoiler 104, rather than the whole front surface of the spoiler 104, is parallel with the front and aft (trailing) edges 14, 16 and walls 8, 10 such that the flow direction 3 impinges on the front undulating surface of the spoiler 104. The longitudinal axis 1 of the spoiler 104 is a straight line passing through both ends of the spoiler 104. Thus in this embodiment the spoiler 104 is positioned perpendicularly to the flow direction 3.

In this embodiment the spoiler 104 is positioned downstream of the leading edge 14 (i.e. above the cavity 2), and the spoiler 104 is positioned closer to the leading edge 14 than it is to the aft (trailing) edge 16. More particularly, in this embodiment the spoiler 104 is positioned such that the distance of the spoiler 104 from the leading edge 14 equals between 0.02 and 0.07× the total distance between the leading edge 14 and the aft (trailing) edge 16. Preferably, the distance is 0.05× the total distance between the leading edge 14 and the aft (trailing) edge 16. In an alternative embodiment, the spoiler 104 is positioned in front of the cavity 2, relative to the flow direction 3. The spoiler 104 may be positioned in front of the cavity 2 by a distance that is equal to between 0.01 and 0.06 (preferably 0.02)× the total distance between the leading edge 14 and the aft (trailing) edge 16.

In this embodiment, the spoiler 104 is positioned such that its lowest extremity (as viewed on the page in the Figures) is approximately level with the top (opening) of the cavity 2, i.e. approximately level with the leading edge 14. In other words, in this embodiment the spoiler 104 does not extend down into the cavity 2. However, this need not be the case, and in other embodiments, a portion of the spoiler 104 may extend down into the cavity 2.

In this embodiment, the spoiler 104 extends completely across the width of the cavity 2. However, this need not be the case, and in other embodiments the spoiler 104 may extend only across a part of the width of the cavity 2, but this will be preferably at least half the width of the cavity 2, and yet more preferably over at least three quarters (¾) of the width of the cavity 2.

The spoiler 104 serves to increase the thickness of the shear layer. The shear layer is the region between a line representing the top (i.e. furthest away from the cavity 2) of the spoiler 104 and a line representing the bottom (i.e. closest to the cavity 2) of the spoiler 104. The thickness of the shear layer at any point along the cavity 2 is correspondingly the distance between the top of the shear layer and the bottom of the shear layer.

While with reference to FIG. 1 the spoiler 104 has been defined as being sinusoidal across its longitudinal axis 1 (i.e. the spoiler 104 has front and rear surfaces, where both surfaces are sinusoidal), the skilled person would appreciate other spoiler 104 designs would provide the same or similar effect. For example, in one embodiment the rear surface of the spoiler 104 is planar while the front surface of the spoiler 104 is sinusoidal. Instead of being sinusoidal, the front surface or front and rear surfaces may follow a cosine wave. Alternatively again, the front surface or front and rear surfaces of the spoiler 104 may be stepped at right angles (i.e. a square wave pattern, where peaks and troughs have right-angled corners) in transverse cross-section i.e. when looking through the spoiler 104 from top to bottom. In other words, some regions (peaks) of the front surface of the spoiler 104 are closer to the front wall 8 of the cavity 2 than other regions (troughs), while the longitudinal axis 1 of the spoiler 104 is parallel with the leading edge 14.

Figure 2:
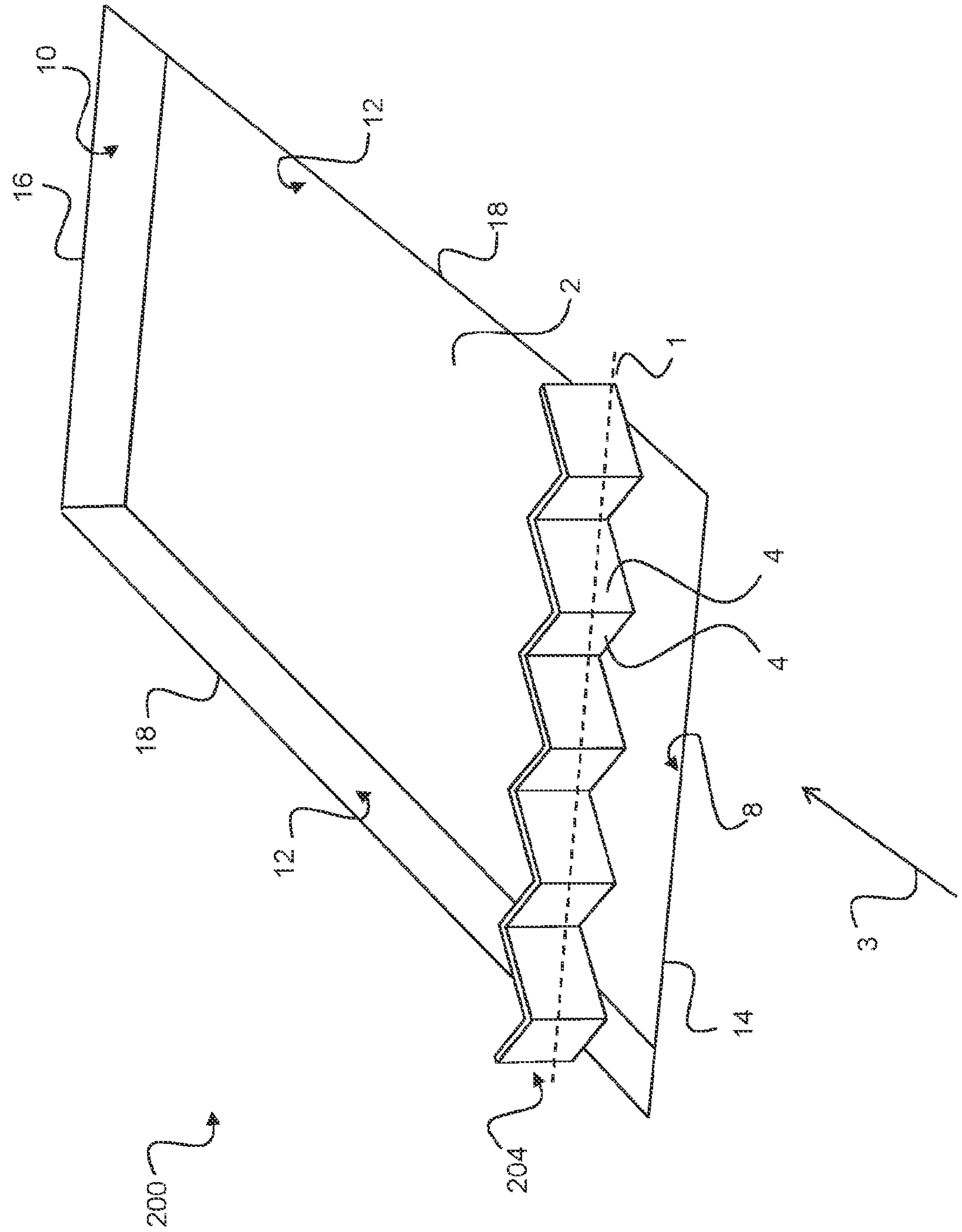
FIG. 2 is a schematic illustration (not to scale) of a perspective view of a cavity acoustic tones suppression system.

An alternative spoiler 204 structure, providing a similar effect to that of the spoiler 104 in FIG. 1, is illustrated as part of the suppression system 200 of FIG. 2. FIG. 2 is the same view of the suppression system 100 as shown in FIG. 1, and the same reference numerals are used for the same features as were used in the earlier Figure.

In FIG. 2, the spoiler 204 takes a zigzag form. In other words, when looking through the transverse cross-section of the spoiler 204 from top to bottom (i.e. in plan view), the front and rear surfaces of the spoiler 204 form a series of connected chevrons (i.e. baseless triangles, or in other words two straight lines connected at an acute, right, or obtuse angle) protruding into the direction of the flow 3.

In one embodiment, the spoiler 204 is formed of a single sheet of material. In another embodiment, the spoiler 204 comprises a series of planar plates 4 (panels, sheets), where adjacent plates 4 are coupled at acute, obtuse or right angles to each other. The spoiler 204 is therefore formed of a series of sharp peaks and troughs in the path of the flow direction 3. Preferably, when viewed from above, adjoining plates 4 are arranged such that an angle of between 10 degrees and 170 degrees is formed between them. Even more preferably, when viewed from above, adjoining plates 4 are arranged such that an angle of about 90 degrees is formed between them.

The number of plates 4 forming the spoiler 204 is greater than or equal to two. In other words, the spoiler 204 comprises at least one chevron. The depth of the chevron may be about 10 centimetres.

In one embodiment, there may be a flat portion (i.e. gap, or space), between each chevron. In other words, part of the front surface of the spoiler 204 may be parallel with the leading edge 14.

The chevrons described above may have sides of equal length, with an axis of symmetry (an axis through the apex) of each chevron arranged orthogonally to the leading edge 14.

Alternatively, the spoiler 204 may take a sawtooth waveform in transverse cross-section. Here, the two side surfaces of the chevrons are not of equal length. For example, the plane of one plate 4 forming the spoiler 204 may be arranged orthogonally to the axis of the leading edge 14, while a connecting plate 4 may be arranged such that its plane is arranged obliquely to the leading edge 14, where the two free ends of each sheet are at equal distance from the leading edge 14.

As illustrated in FIGS. 3 to 6, the spoiler 304-604 may comprise teeth 5 (i.e. a series of protrusions). FIGS. 3 to 5*b* illustrate perspective views of various spoiler designs in cutaway.

Figure 3:
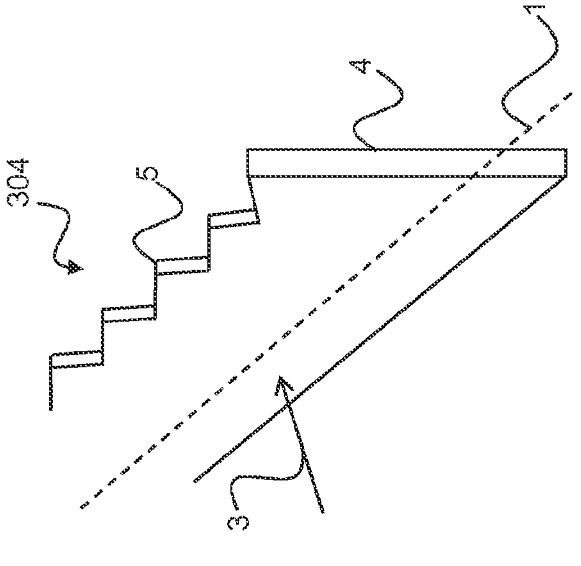
FIG. 3 is a schematic illustration (not to scale) of a perspective view of a spoiler for use in a cavity tones suppression system.

FIG. 3 illustrates a perspective view of a spoiler 304, the concept of which could be introduced to the suppression system 100/200 described with reference to FIGS. 1 and 2. Here, the spoiler 304 is formed of two parts. The spoiler 304 comprises a plate 4 and one or more teeth 5. In the embodiment illustrated in FIG. 3, the teeth 5 and plate 4 are integrally formed i.e. the teeth 5 are formed in the top surface (i.e. top edge) of the plate 4. The plate 4 takes the same general form as the spoiler 104/204 described with reference to FIGS. 1 and 2. In an alternative embodiment, the plate 4 is planar, i.e. flat, across the bulk of its frontal surface.

While the teeth 5 are all shown as occupying the whole width of the top edge of the spoiler 304 in FIG. 3, this need not be the case. A first tooth may be arranged closer to the front surface of the spoiler 304 than a second tooth, where both teeth are arranged on the top edge of the spoiler 304. In this way, air impacting the spoiler 304 from the flow direction 3 tends to hit the first tooth before the second tooth, which introduces variations in the creation of vortices.

In the illustrated embodiment, the teeth 5 are all of the same longitudinal cross-sectional shape (triangular with substantially equilateral sides, when viewed along the flow direction 3 or head on) as each other, and are all of the same size as each other. Instead, of being triangles, the teeth 5 may be rectangular, rounded, semi-circular, irregularly shaped, or square in longitudinal cross-section (i.e. when viewed along the flow direction 3 or head on). In other words, the teeth 5 may take a more curved or rounded form, or a flatter form, than the pointed teeth 5 illustrated. The teeth 5 may be much wider (i.e. longer in the direction of the longitudinal axis 1 of the spoiler 304) than those illustrated. The teeth 5 may be wide and rounded, such that the upper edge of the plate 4 appears to take a wave, or sinusoidal, form in longitudinal cross-section.

In alternative embodiments, some teeth 5, or even one tooth in the set of teeth 5, may be of different cross-sectional shapes or surface areas to the other teeth 5. For example, a first tooth may be semi-circular in cross-section, while an adjacent second tooth may be rectangular in cross-section.

In this embodiment the teeth 5 are arranged on the plate 4 such that the face of each tooth 5 is parallel with the portion of the plate 4 to which it is attached, i.e. the plane of the front surface of each tooth 5 is generally perpendicular to the flow direction 3.

In this embodiment, the teeth 5 are all arranged in a symmetric evenly spaced arrangement i.e. the teeth 5 are distributed evenly over the plate 4. One tooth is shown being directly coupled to the adjacent tooth. Alternatively, there may be regular gaps between each tooth.

The teeth 5 are illustrated as forming about 10% of the total surface area of the spoiler 304. This is for illustrative purposes only. The teeth 5 may be smaller or larger than those illustrated, such that between 1% and 75% of the spoiler 304 surface area is formed of teeth 5. Preferably, between 5% and 15% of the spoiler 304 surface area is formed of teeth 5.

In operation, one effect of the spoiler 104 comprising the plurality of teeth 5 is to tend to increase the thickness of the shear layer compared to if the spoiler 304 with teeth 5 was not present, or indeed if there was a plate 4 present that nevertheless had no teeth 5. This is at least in part due to the teeth 5 presenting a disruption or change to the air flow direction to deflect the flow both in and out of the cavity 2 (the latter being nevertheless near the top of the cavity 2).

The teeth 5 may increase the deflection of the vortices into and/or out of the cavity 2, thereby further enhancing the thickening of the shear layer. The teeth 5 may additionally or alternatively serve as additional sources of fine scale turbulence giving rise to yet further small vortices, hence tending to provide yet further loss of temporal coherence.

Figure 6:
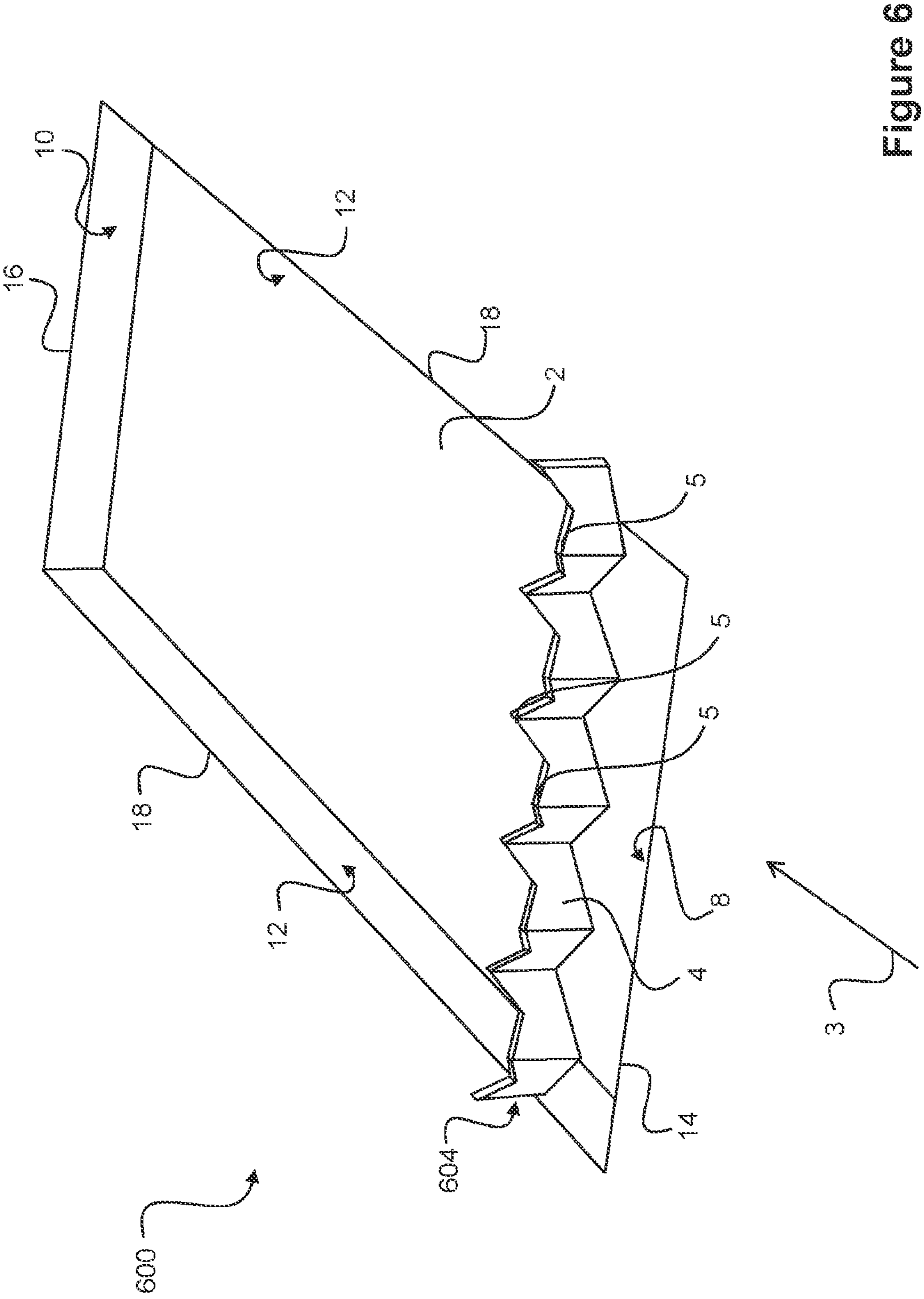
FIG. 6 is a schematic illustration (not to scale) of a perspective view of a cavity acoustic tones suppression system.

The teeth 5 may extend to different heights relative to each other. For example, a first tooth may be of height x, a second adjacent tooth may be of different height y, and another tooth adjacent to the second tooth may be of height x. This is shown in FIG. 6.

Where the teeth 5 are arranged on a plate 4 having the shapes described with reference to the spoiler 104/204 of FIGS. 1 and 2, altering frequency and amplitude of the wave, or number of panels making up the zig zag, along with altering the width of each tooth, adjusts the number of teeth 5 on the spoiler 104/204.

Figure 4:
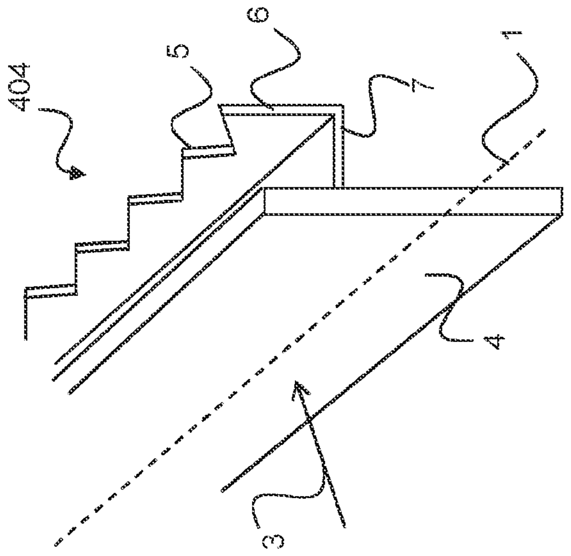
FIG. 4 is a schematic illustration (not to scale) of a perspective view of a spoiler for use in a cavity tones suppression system.

In FIG. 4, the teeth 5 are offset from the spoiler 404 along the axis of the flow direction 3. In other words, a connecting structure may be used to attach the teeth 5 to the plate 4 such that they protrude from the top of the spoiler 104/204. Here, the teeth 5 are connected such that they project out and upwards from the rear surface of the plate 4. In an alternative embodiment, the teeth 5 project out and upwards from the front surface of the plate 4. In an alternative embodiment again, and as illustrated in FIG. 5*a*, the teeth 5 project out and upwards from both the front and the rear surfaces of the plate 4.

In the illustrated embodiment, the connecting structure comprises a horizontal member 7 and a vertical member 6. The skilled person would appreciate that horizontal member 7 need not be exactly horizontal, and the vertical member 7 need not be exactly vertical. One end of the horizontal member 7 is connected to the rearward-facing surface of the plate 4. The vertical member 6 is attached at substantially right angles (i.e. between 75 degrees and 105 degrees) to the free end of the horizontal member 7. Teeth 5 are arranged along the upper edge of the vertical member 6, similarly to as described above with reference to FIG. 3.

In an alternative embodiment, the connecting structure may be a single member, such as a diagonal member protruding upwards and away from the face of the plate 4. Alternatively, the connecting structure may comprise only the vertical member 6, coupled by its surface to the rear surface of the plate 4.

As explained with reference to FIG. 3, the teeth 5 are illustrated as extending along the whole length of the vertical member 6, which in turn extends along the whole length of the plate 4. However, in other embodiments, there may be gaps between the teeth 5, the teeth 5 may only extend partially along the vertical member 6, or the vertical member 6 may only extend partially along the length of the plate 4.

By having the teeth 5 offset from the plate 4, shedding of the vortices tends to occur at different times, i.e. at different stages of the formation of the shear layer (by providing sources of fine scale turbulence at differing points in time along the flow), hence tending to further increase the extent of the disruption of temporal coherence between the different vortices shed by the different teeth 5 and thus reducing noise and acoustic tones within the cavity 2.

In FIG. 5*a*, a first set of teeth 5*a* project upwards from the front surface of the plate, and a second set of teeth 5*b* project upwards from the rear surface of the plate 4. The first set of teeth 5*a* and second set of teeth 5*b* (generally, 5) are attached to the plate 4 by the same connecting structures as described with reference to FIG. 4.

Figure 5B:
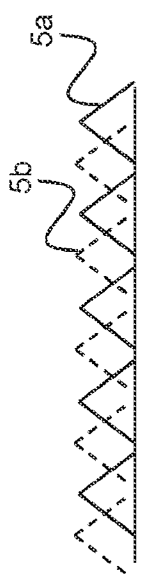
FIG. 5*b* is a schematic frontal view (not to scale) of the spoiler of FIG. 5*a*.
Figure 5A:
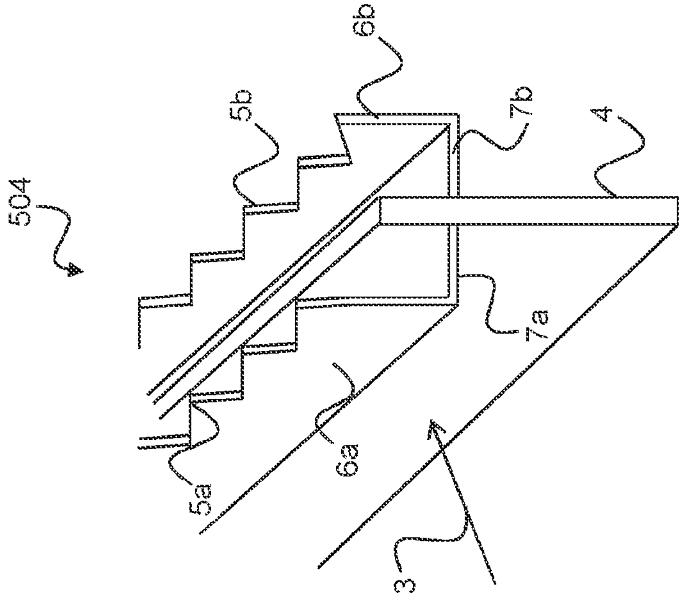
FIG. 5*a* is a schematic illustration (not to scale) of a perspective view of a spoiler for use in a cavity tones suppression system.

FIG. 5*b* shows the teeth 5 when viewed directly from the front of the spoiler 504. The teeth 5*a* on one side of the spoiler 504 are offset along the longitudinal axis 1 of the spoiler 504 from corresponding teeth 5*b* on the opposite side of the spoiler 504. In FIG. 5*b*, the teeth 5 are viewed from the front, i.e. as would be seen when viewing along the flow direction 3. In other words, all teeth 5, on both sides of the spoiler 504, would be visible when viewing the spoiler 504 from the front. This provides a similar effect to the spoilers 104/204 of FIGS. 1 and 2, in which the airflow impinges on different parts of the spoiler 504 at different times.

The concepts outlined in FIGS. 3 to 5*b* may be combined. For example, in a set of teeth 5, a first tooth may be integrally formed with the top edge of the spoiler (as in FIG. 3), while a second immediately adjacent tooth may be offset from the top edge of the spoiler (as in FIG. 4), with a third immediately adjacent tooth again integrally formed with the top of the spoiler.

FIG. 6 illustrates a further embodiment of a suppression system 600, which is similar to the suppression system 200 of FIG. 2 having a spoiler 604 with an arrangement of teeth 5 on its upper surface. Here, adjacent teeth 5 are arranged at different heights to each other. Each plate 4 is provided with one half of a tooth, such that two adjoining plates 4 form a single tooth.

In operation, an effect of the plurality of teeth 5, spread over different heights over the extent plate 4, is to tend to provide multiple sources of fine scale turbulence giving rise to a plurality of small vortices at differing heights. Due at least in part to the thicker shear layer, in particular the plurality of heights at which the vortices are shed due to the different heights of the different teeth 5, the vortices tend not to combine into larger ones. By provision of the thicker shear layer, and the plurality of heights at which the vortices are shed due to the different heights of the different teeth 5, the vortices 30 closer to the top of the shear layer (i.e. closer to the ambient fluid flow) propagate downstream faster than those vortices closer to the bottom of the shear layer (i.e. closer to the static air in the cavity 2). Accordingly the vortices arrive at given points downstream at different times i.e. there is a loss of temporal coherence, and consequently there is a disruption of the conventional tendency for formation of large scale turbulent structures that would otherwise play a key role in the generation of unwanted acoustic tones. Furthermore, by virtue of the additional height achieved in total by use of the overall height of the spoiler 604, differing boundary layer thicknesses tend to be readily accommodated (without requiring positional adjustment).

By providing the teeth 5 at different heights relative to the top of the undulating spoiler 604, different teeth 5 heights are located at different distances along the flow direction 3, from the leading edge 14. This will tend to encourage shedding of the vortices to occur at different times, i.e. at different stages of the formation of the shear layer (by providing sources of fine scale turbulence at differing points in time along the flow), hence tending to further increase the extent of the disruption of temporal coherence between the different vortices shed by the different teeth 5. Although less effective, a similar advantage is achieved where all teeth 5 are of uniform height along the undulating spoilers 104/204 shown in FIGS. 1 and 2.

In general it will be appreciated that any non-uniformity introduced into the form of one or more of the individual teeth 5 and/or any non-uniformity introduced between one or more of the different teeth 5 and/or their relative arrangements/positions etc. will tend to provide the possibility of increased numbers or variations of sources of fine scale turbulence, with corresponding increased numbers of small vortices and/or thicker shear layer and/or increased disruption of the temporal coherence of the small vortices. Any such effects may further improve the suppression performance of the suppression system 100/200.

In the above embodiments, the teeth 5 are all spaced in a symmetric evenly spaced arrangement, i.e. the teeth 5 are distributed evenly over the top surface of the plate 4. However, this need not be the case, and in other embodiments some or all of the teeth 5 are distributed unevenly over the top surface of the plate 4 (i.e. the spaces between adjacent teeth 5 may not be uniform). There may be irregular gaps between teeth 5. An uneven distribution, and in particular a non-even height distribution, will tend to further disrupt the temporal coherence of the small vortices. Furthermore, the teeth 5 may only extend part way along the length of the plate 4. For example, the teeth 5 may only extend 50% of the way along the plate 4, centralized on the mid-point of the plate 4. Preferably, the teeth 5 extend between 50% and 100% along the length of the plate 4.

In the above embodiments, the plane of each tooth is arranged in parallel with the plane of the plate 4 at the point where the tooth is connected to the plate 4. In other words, if the plate 4 is parallel with the leading edge 14, then the frontal plane of the teeth 5 is in parallel with the leading edge 14. However, this need not be the case, and in other embodiments one or more of the teeth 5 may be twisted relative to the plate 4 i.e. a plane through a tooth may not be parallel with a plane through the plate 4.

Instead of being arranged orthogonally to the flow direction 3, the spoiler 104-604 may be angled (in the vertical plane as viewed in the Figures) relative to the flow direction 3. In this embodiment, the front surface of the spoiler 104-604 presents an acute angle to the impinging flow direction 3. In other words, a first region of the front surface of the spoiler 104-604 is located closer to the front of the cavity 2 than a second region of the front surface of the spoiler 104-604. Particularly, where the spoiler 104 has an undulating front surface as in FIG. 1, a longitudinal axis passing through each end of the spoiler 104 may form an obtuse angle relative to the impinging flow direction 3.

Returning to a more general discussion of further embodiments, in the above embodiments the spoiler 104-604 is positioned downstream of the leading edge, with the spoiler 104-604 positioned such that the distance of the spoiler 104-604 from the leading edge 14 equals 0.05× the total distance between the leading edge 14 and the aft (trailing) edge 16. However, this need not be the case, and in other embodiments the spoiler 104-604 may be positioned at any position downstream of the leading edge that is in the proximity of the leading edge 14. This may include, for example, any position downstream of the leading edge 14 that is closer to the leading edge 14 than it is to the aft (trailing) edge 16, as some degree of suppression will still tend to occur. However, preferably the spoiler 104-604 is positioned closer to the leading edge 14 than that, as then an even greater extent of the suppression effect will tend to occur. For example, as well as the preferred positioning at a distance downstream from the leading edge 14 of 0.05× the total distance between the leading edge 14 and the aft (trailing) edge 16, even more preferred is any positioning at a distance of ≤0.05× the total distance, but also preferred more generally is positioning at a distance of ≤0.1× the total distance, and yet more generally any positioning at a distance of ≤0.2× the total distance.

In the above embodiments, the spoiler 104-604 is positioned downstream of the leading edge 14 (i.e. above the cavity 2). However, this need not be the case, and in other embodiments the spoiler 104-604 may be positioned upstream of the leading edge 14, i.e. above the surface 19 rather than above the cavity 2. In such embodiments, the spoiler 104-604 may be positioned upstream from the leading edge 14 at any position in the proximity of the leading edge 14, which may be at any distance from the leading edge ≤half the distance between the leading edge 14 and the aft (trailing) edge 16. Preferably, however, the spoiler 104-604 is positioned upstream from the leading edge 14 at a distance from the leading edge ≤0.2× the distance between the leading edge 14 and the aft (trailing) edge 16; more preferably at a distance from the leading edge ≤0.1× the distance between the leading edge 14 and the aft (trailing) edge 16; and yet more preferably at a distance from the leading edge ≤0.05× the distance between the leading edge 14 and the aft (trailing) edge 16.

In yet further embodiments, the spoiler 104-604 may be positioned directly over the leading edge 14. It will also be appreciated that in those embodiments where the spoiler 104-604 is arranged at an oblique angle to the flow direction 3, respective different heights of the spoiler 104-604 may be located at any two or three of the above possibilities, namely downstream of the leading edge 14, directly above the leading edge 14, and upstream of the leading edge 14.

In the above embodiments, the cavity 2 is rectangular and comprises a planar base, the cavity 2 further comprises, defined relative to an actual or intended flow direction 3, a leading wall 8, an aft (trailing) wall 10, and two side walls 12, and these walls are all perpendicular to the planar base. However, these specific cavity details are not essential, and in other embodiments any other cavity shape may be present. For example, there need not be only four walls, the walls need not be straight or perpendicular, the cavity may be defined by one or more walls forming a curved or partially curved perimeter to the cavity, the perimeter may be irregularly shaped, one or more walls may be sloping, the base and or one or more walls may be undulating or sloped, and so on. However, the suppression will tend to occur more strongly the more straightforwardly the leading edge 14 (compared to the actual or intended airflow direction 3) is defined or present.

Also, it will be appreciated that in embodiments with cavity 2 shapes as described above, including irregularly shaped cavities 2, the skilled person will modify such directions described above as parallel, transverse, perpendicular, and the like, which are suitable for regularly shaped cavities 2, to provide other directions that achieve corresponding functionalities, at least to some extent, as those described above as parallel, transverse, perpendicular, and the like. Also, even when the cavity 2 is regularly shaped, in yet further embodiments, directions that contain a resolved part of the described parallel, transverse, perpendicular, and the like direction may be implemented instead of completely parallel, transverse, perpendicular, and the like directions. For example, the spoiler 104-604 may cross a rectangular cavity 2 with a transverse direction that is at an oblique angle to the stated direction, but contains a resolved element of that direction and hence of its effect, for example at a direction of 15°, 30° or 45° to the direction parallel to the leading edge 14.

While the embodiments of the suppression system 100-600 described above are suitable for application on an aircraft, such as a civil airliner, military fighter jet or a helicopter, they are also suitable to other forms of vehicle. For example, the suppression system 100-600 is applicable to land vehicles such as trains and high performance cars, and naval vessels such as yachts and submarines. While the ambient fluid is described above as flowing air (i.e. airflow), it may be water. The cavity may be a wheel well, torpedo tube, weapons bay, window, sunroof, open superstructure, or any other cavity moving through fluid.

The invention claimed is:

1. A cavity system, comprising:

a cavity and a spoiler; the spoiler comprising at least one plate having a front surface and a rear surface, an undulating edge in longitudinal cross-section, and a connecting structure for coupling the undulating edge the at least one plate, wherein the spoiler is positioned in proximity to a leading edge of the cavity, the leading edge being relative to an actual or intended flow direction of a fluid over the cavity, and wherein the spoiler is arranged with its longitudinal axis perpendicular or at an oblique angle to the actual or intended flow direction such that the front surface faces towards the flow direction;

wherein the at least one plate has a height in a direction extending from the cavity (H) and a depth between the front surface and the rear surface (D), where H is larger than D;

wherein the connecting structure has a first end attached to the front surface of the at least one plate or the rear surface of the at least one plate and a second end comprising the undulating edge; and wherein the undulating edge is either: offset from the rear surface of the at least one plate in the flow direction or offset from the front surface of the at least one plate in an opposite direction.

2. The cavity system according to claim 1, wherein the undulating edge comprises a first undulating edge and a second undulating edge and wherein the cavity system further comprises a first connecting structure for coupling a first undulating edge to each of the at least one plate and a second connecting structure for coupling a second undulating edge to each of the at least one plate, the first connecting structure having a first end attached to the front surface of each of the at least one plate and a second end comprising the first undulating edge, and the second connecting structure having a first end attached to the rear surface of each of the at least one plate and a second end comprising the second undulating edge.

3. The cavity system according to claim 2, wherein the first undulating edge comprises a first set of teeth and the second undulating edge comprises a second set of teeth, wherein the first set of teeth is offset from the second set of teeth along the longitudinal axis of the spoiler.

4. The cavity system according to claim 1, wherein the undulating edge comprises a plurality of teeth.

5. The cavity system according to claim 4, wherein a first tooth in the plurality of teeth is arranged closer to the leading edge than a second tooth in the plurality of teeth.

6. The cavity system according to claim 4, wherein the teeth are generally triangular in longitudinal cross-section.

7. The cavity system according to claim 4, wherein a proportion of an area of the spoiler taken up by the teeth is ≤75%.

8. An aircraft comprising the cavity system according to claim 1, wherein the cavity is a weapons bay.

9. The cavity system according to claim 1, wherein the front surface and the rear surface of the at least one plate is parallel to the undulating edge.

10. The cavity system according to claim 1, wherein the undulating edge extends beyond the height of the at least one plate.

11. The cavity system according to claim 1, wherein the connecting structure comprises a first member and a second member angled with respect to the first member, the first member having the first end and the second member having the second end.

12. The cavity system according to claim 11, wherein the first member is orthogonal to the second member.

13. The aircraft of claim 8, wherein the spoiler is rotatably attached to a surface surrounding an outside of the cavity.

* * * * *